United States Patent
Piastra et al.

(12) 
(10) Patent No.: US 6,200,378 B1
(45) Date of Patent: Mar. 13, 2001

(54) THIAZINE INDIGO PIGMENTS, SOLID SOLUTIONS THEREOF AND THEIR PREPARATION

(75) Inventors: Bruno Piastra, Huningue (FR); Bansi Lal Kaul, Biel-Benken (CH)

(73) Assignee: Clariant Finance (BVIØ) Limited, Tortola (VG)

( * ) Notice: Subject to any disclaimer, the term of this patent is extended or adjusted under 35 U.S.C. 154(b) by 0 days.

(21) Appl. No.: 09/355,124

(22) PCT Filed: Jan. 28, 1998

(86) PCT No.: PCT/IB98/00109

§ 371 Date: Jul. 23, 1999

§ 102(e) Date: Jul. 23, 1999

(87) PCT Pub. No.: WO98/32800

PCT Pub. Date: Jul. 30, 1998

(30) Foreign Application Priority Data

Jan. 29, 1997 (GB) .................................. 9701784
May 5, 1997 (GB) .................................. 9709193
Aug. 1, 1997 (GB) .................................. 9716159
Dec. 12, 1997 (CH) .................................. 2869/97

(51) Int. Cl.[7] .............................. C09B 7/00; C09B 67/22; C08K 5/46; C09D 11/00

(52) U.S. Cl. ......................... 106/498; 106/413; 106/493; 106/494; 106/495; 106/496; 106/497; 544/47; 544/51; 544/56; 544/58.5; 544/58.6; 544/58.7

(58) Field of Search ............................. 106/413, 493, 106/494, 495, 496, 497, 498; 544/47, 51, 56, 58.5, 58.6, 58.7

(56) References Cited

U.S. PATENT DOCUMENTS 3,803,139 * 4/1974 Lai Kaul .................. 106/498
5,484,943 * 1/1996 Zambounis et al. .......... 548/453
5,518,539 * 5/1996 Hao et al. ................. 106/495
5,591,865 * 1/1997 Hao et al. ................. 548/453
5,616,725 * 4/1997 Zambounis et al. .......... 548/253
5,646,299 * 7/1997 Hao et al. ................. 548/453
5,650,520 * 7/1997 Hao et al. ................. 548/453

FOREIGN PATENT DOCUMENTS

2536120 * 4/1995 (DE) .
648770 * 4/1995 (EP) .
654506 * 5/1995 (EP) .

* cited by examiner

*Primary Examiner*—Anthony Green
(74) *Attorney, Agent, or Firm*—Susan S. Jackson; Scott E. Hanf

(57) ABSTRACT

A compound according to the formula (I)

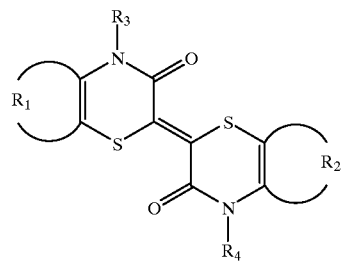

wherein $R_1$ and $R_2$ are independently the atoms necessary to complete the formation of a substituted or unsubstituted aromatic or aliphatic carbocyclic or heterocyclic ring system and $R_3$ and $R_4$ have the meaning indicated in claim 1, a new process for the preparation of such a compound, solid solutions and mixtures comprising such a compound and the use of a compound of formula (I) as a pigment.

27 Claims, No Drawings

THIAZINE INDIGO PIGMENTS, SOLID SOLUTIONS THEREOF AND THEIR PREPARATION

BACKGROUND OF THE INVENTION

Thiazine indigo compounds are an important series of pigments. Prior art processes for forming these pigments involve the reaction of certain o-aminomercapto- carbocycles or heterocycles with maleic acid or a derivative thereof in the presence of a solvent. The solvents useful for this purpose were recognized to be either a carboxylic acid (which also acted to catalyze the reaction) or an inert polar aprotic solvent.

Thus in DE 2 151 723 a process is described for making certain symmetrically substituted benzothiazine indigo compounds wherein certain substituted ortho-aminomercapto-carbocycles or heterocycles are reacted with a maleic acid derivative in a carboxylic acid, e.g. acetic acid. The pigments formed in this way are produced in good yield but they exhibit dull shades. By symmetrically substituted is meant that there is identical substitution on each of the thiazine rings.

In DE OS 25 36 120 a process is described for making certain other symmetrically substituted benzothiazine indigo compounds wherein certain substituted ortho-aminothiophenols are reacted with a maleic acid derivative in an inert polar aprotic solvent. The benzothiazine indigo compounds formed, allegedly display improved pigmentary properties, e.g. brighter and cleaner shade over the compounds made in a carboxylic acid solution, however, they can only be produced in poor yield.

There remains a need to provide further thiazine indigo pigments and an improved process of forming thiazine indigo pigments.

SUMMARY OF THE INVENTION

It has now been found that new thiazine indigo pigments can be formed in high yield and, which exhibit pigmentary properties which are better than heretofore achieved.

This invention relates to thiazine indigo pigments, solid solutions thereof and to a process of forming such pigments and solid solutions.

The invention provides in one of its aspects a pigment which is a compound according to the formula (I)

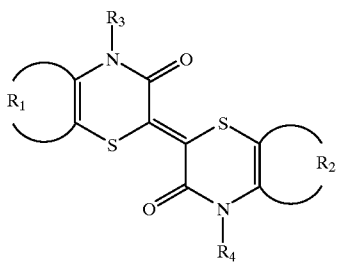

(I)

wherein $R_1$ and $R_2$ are independently the atoms necessary to complete the formation of a substituted or unsubstituted aromatic or aliphatic carbocyclic or heterocyclic ring system, the radicals $R_3$ and $R_4$, independently of each other, are hydrogen or a group of the formulae (II), (III) or (IV)

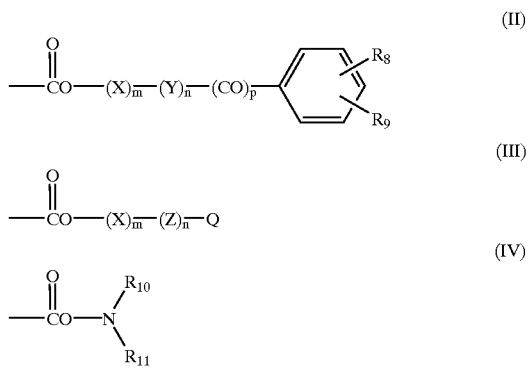

whereby in the formulae (II), (III) and (IV)

m, n and p, independently of each other, are zero or 1;

X $C_{1-14}$-alkalene or $C_{2-8}$-alkylene;

Y a group $-V-(CH_2)_q-$;

Z a group $-V-(CH_2)_r-$;

V Cycloakylene;

q a number of 1 to 6; and r a number of zero to 6, $R_8$ and $R_9$ independently of each other, signify hydrogen, $C_{1-6}$-alkyl, $C_{1-4}$-alkoxy, halogen, CN, $NO_2$, unsubstituted phenyl or phenoxy, phenyl or phenoxy substituted by $C_{1-4}$-alkyl, $C_{1-4}$-alkoxy or halogen;

Q hydrogen, CN, $Si(R_8)_3$, a group $C(R_{12})(R_{13})(R_{14})$, in which $R_{12}$, $R_{13}$ and $R_{14}$ are halogen; a group

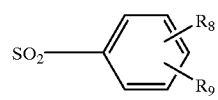

in which $R_8$ and $R_9$ have the above meaning; a group $SO_2-R$, or $SR_{15}$, in which $R_{15}$ is $C_{1-4}$-alkyl; a group $CH(R_{16})_2$, in which $R_{16}$ is unsubstituted phenyl or phenyl substituted by $C_{1-4}$-alkyl, $C_{1-4}$-alkoxy or halogen; or a group of the formula

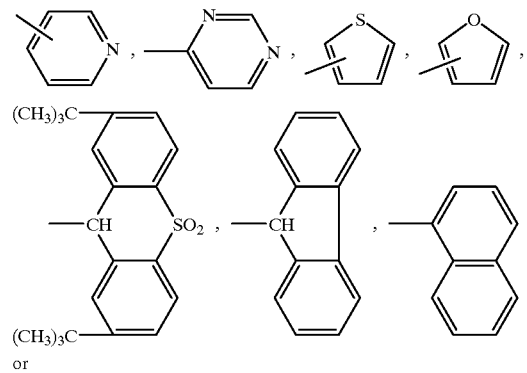

or

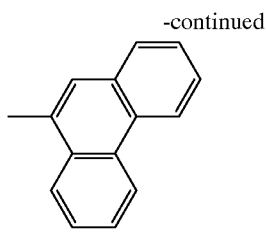

$R_{10}$ and $R_{11}$ independently of each other, signify hydrogen, $C_{1-18}$-alkyl, a group

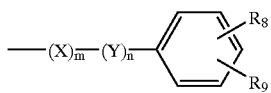

in which X, Y, $R_8$, $R_9$, m and n have the above meaning, or
$R_{10}$ and $R_{11}$, together with the nitrogen atom to which they are bound, build a pyrrolidinyl-, piperidinyl- or morpholinylrest, provided that, if $R_3$ and/or $R_4$ are a group of the formula (III), Q is hydrogen and n is zero, m must be 1 and X a $C_{2-14}$-alkylene- or $C_{2-8}$-alkylene group which is branched at the carbon atom bound to oxygen, and if both $R_3$ and $R_4$ are hydrogen, $R_1$ and $R_2$ cannot be identical.

DESCRIPTION OF THE PREFERRED EMBODIMENTS

Preferably $R_1$ and $R_2$ are independently selected from the residues consisting of

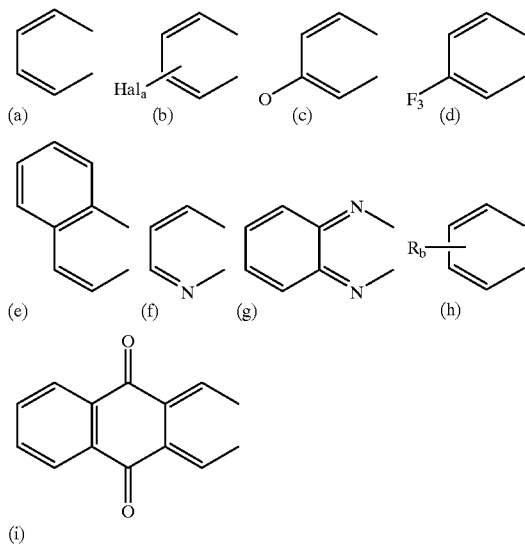

where Hat is halogen which includes F, Cl and Br, especially Cl

R is $C_{1-4}$ alkyl especially methyl or ethyl a is 1, 2, 3 or 4 b is 1, 2, 3 or 4

In a preferred pigment according to the invention $R_1$ is a residue which consists of the atoms necessary to complete a benzene ring which is optionally substituted with, for example halogen or alkyl and $R_2$ consists of the atoms necessary to complete a ring system which is a differently substituted benzene ring or a different substituted or unsubstituted aromatic or aliphatic carbocyclic or heterocyclic ring system, e.g. naphthalene, pyridine or 1,4-benzodiazine.

The pigments may be substituted on the ring systems with one or more of any of the non-water-solubilising substituents common in the art of pigments. Preferably the ring system substituents are selected from the group consisting of halogen, trifluoromethyl, nitro, cyano, alkyl, alkoxy, amino, alkylamino, thioalkyl, phenoxy, phenylamino, phenylthio, acyl, acyloxy or acylamino.

The term "halogen" includes fluorine and especially chlorine and bromine. The term "alkyl" or "alkoxy" includes said functionality having from 1 to 4 carbon atoms. The terms "alkylamino" and "phenylamino" include N,N-dialkylamino and N,N-diphenylamino as well as N-monoalkylamino and N-monophenylamino.

The aforementioned alkyl, alkoxy, phenyl and phenoxy substituents may themselves contain one or more substituents selected from the substituents hereinabove described.

The invention provides in one of its further aspects a process of forming thiazine indigo pigments according to the formula (I)

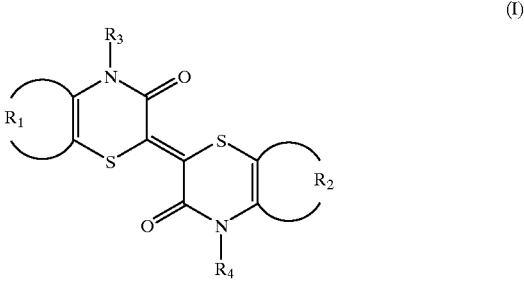

wherein $R_1$ and $R_2$ are independently the atoms necessary to complete the formation of a substituted or unsubstituted aromatic or aliphatic carbocyclic or heterocyclic ring system, $R_3$ and $R_4$ are hydrogen, comprising the step of reacting in the presence of a solvent system comprising a carboxylic acid and an inert polar aprotic solvent, a compound of formula (II) and a compound of formula (III)

wherein $R_5$ and $R'_5$ independently are H or a metallic ion selected from $Na^+$, $K^+$ or $Zn^{2+}$ with a compound of formula (IV)

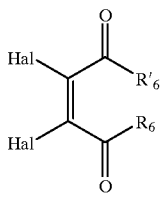
(IV)

wherein Hal is Cl or Br, $R_6$ and $R'_6$ independently of the other is a leaving group commonly used in substitution reactions at carbonyl carbon atoms, e.g. Cl or alkoxy or together X and X' represent an oxygen atom. A compound of formula (IV) shown in its cis-form above may also be used in its trans-form.

Preferably the molar ratio of the reactants is 1:1:1.

The process is carried out in the presence of a carboxylic acid, e.g. acetic acid, which also acts as a catalyst, and an inert polar aprotic solvent, e.g. xylene or a xylene mixture, nitrobenzene, chlorobenzene, dimethylformamide, or dimethylacetamide, in particular dimethylformamide, dimethyl acetamide or N-methylpyrrolidone. The reaction is preferably carried out in solvent system which consists of 5 to 95% by weight of carboxylic acid, e.g. acetic acid, more preferably 10% by weight and 95 to 5% by weight of polar aprotic solvent, more preferably 90% by weight.

The reaction temperature is preferably of the order of 60 to 200° C.

The thiazine indigo pigments produced by the above process may be symmetrically substituted, that is $R_1$ and $R_2$ as well as $R_3$ and $R_4$ are identical. Alternatively, they may be asymmetrically substituted, that is, $R_1$ and $R_2$ or $R_3$ and $R_4$ are not identical. Non-identity refers to either the ring systems $R_1$ and $R_2$ being different or, in the event that the ring systems are identical, the substituents attached to the respective ring systems are different. The asymmetrical compounds are novel compounds.

Thiazine indigo pigments according to formula (I) in which at least one of the substituents $R_3$ and $R_4$ is not hydrogen, are produced by reacting the pigments of formula (I) in which both $R_3$ and $R_4$ are hydrogen, with a dicarbonate of formula (V)

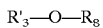
(V)

or with a trihaloacetic acid ester of the formula (VI)

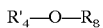
(VI)

or with a mixture of dicarbonate of the formula (V) and a dicarbonate of the formula (VII)

$R'_4$—O—$R'_4$ (VII)

or with a mixture of trihaloacetic acid ester of the formula (VI) and a trihaloacetic acid ester of the formula (VIII)

$(R_7)_3$—C—$R'_4$ (VIII)

or with an azide of the formula (IX)

$R_3N_3$ (IX)

which can also be used as a mixture 1:1 with an azide of the formula (X)

$R_4N_3$ (X)

or with a carbonate of the formula (XI)

$R'_3$—O—$R_8$ (IX)

which can also be used as a mixture 1:1 with a carbonate of the formula (XII)

$R'_4$—O—$R_8$ (XII)

or with an alkylideneiminooxyformic acid ester of the formula (XIII)

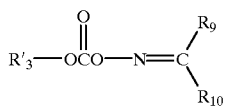
(XIII)

which can also be used as a mixture 1:1 of the formula (XIV)

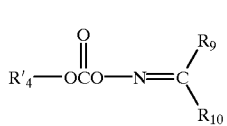
(XIV)

whereby in the formulae (V), (VI), (VII), (VIII), (IX), (X), (XI), (XII), (XIII) and (XIV)

$R'_3$ and $R'_4$ have the meanings of $R_3$ and $R_4$ except hydrogen, $R_7$ means chlorine, fluorine or bromine, $R_8$ is $C_{1-4}$alkyl, unsubstituted phenyl or phenyl substituted by halogen, $C_{1-4}$alkyl, $C_{1-4}$alkoxy or —CN, $R_9$ is —CN or —COOR$_8$, and $R_{10}$ is unsubstituted phenyl or phenyl substituted by halogen, $C_{1-4}$alkyl, $C_{1-4}$alkoxy or —CN in an aprotic organic solvent in the precense of a base as a catalyst. Preferably such reaction is performed at temperatures from zero to 200° C., more preferably from 10 to 100° C., and lasts from 2 to 48 hours.

The invention also provides a solid solution or a mixture of a thiazine indigo pigment according to formula (I) and another pigment of the class comprising diketopyrrolopyrrole, quinacridone, anthraquinone, benzimidazole, naphthole AS, azo condensation, isoindolinone, isoindoline, perylene, dioxazine, indigo, thioindigo, metal complex, perinone, quinophthalone and phthalocyanine pigments.

The portion of the thiazine indigo pigment in said solid solutions or mixtures can vary between 20 and 80% by weight, in particular between 30 and 70% by weight, especially between 40 and 60% by weight. The preferred pigments according to formula (I) are those indicated above and most preferred pigments are those according to formula (I) in which $R_1$ and $R_2$ are the residues consisting of the atoms necessary to complete a benzene ring which is optionally substituted with, for example halogen or alkyl.

Another aspect of the present invention is a method for preparing said solid solutions or mixtures by synthesizing and/or finishing one of said pigments in the presence of the other. So it is possible to synthesize a pigment of formula (I) in the presence of the other pigment, or the other pigment is synthesized in the presence of a thiazine indigo pigment of formula (I). The conditions of synthesizing the pigments of formula (I) are described above. Especially, the reactants and the other pigments are employed in such portions as to yield a solid solution or mixture as described above.

Alternatively, the solid solutions and/or the mixtures of a thiazine-indigo pigment and another pigment can be prepared by dissolving the pigments in an appropriate solvent like dimethylsulfoxide or an alcohol, in the presence of sodium hydroxide or potassium hydroxide or sodium alcoholate or potassium alcoholate, and precipitating the pigment in water or a mixture of water and an alcohol, or adding water or a mixture of water and an alcohol into the alcaline solution of pigments. One can also use organic or inorganic acids in the precipitation step.

Another way to prepare solid solutions and/or the mixtures of a thiazine-indigo pigment and another pigment, is to dissolve partially or completely a thiazine-indigo pigment and another pigment in sulfuric acid or concentrated sulfuric acid, or polyphosphoric acid, at temperatures from 0° C. to 200° C., and to precipitate the pigment particles by adding water or a mixture of water and an alcohol, or by pouring the acidic medium in ice or water or a mixture of water and an alcohol. One can also use additives known in the state-of-the-art to control the particle size of the pigment.

The thiazine indigo pigments formed by a process according to the invention are suitable for the mass pigmentation of suitable substrates including synthetic polymers, synthetic resins and regenerated fibers optionally in the presence of solvents. These substrates more particularly include oil, water and solvent based surface coatings, polyester spinning melts, polyethylene, polystyrene and polyvinyl chloride molding materials, rubber and synthetic leather. Furthermore, the pigments can be used in the manufacture of printing inks, for the mass coloration of paper and for coating and printing textiles.

When applied to the afore-mentioned substrates the thiazine indigo pigments are found to be resistant to migration and fast to light, and show fastness to washing, chlorite, hypochlorite and peroxide bleaching, rubbing, overspraying and solvents. Notably, the pigments display high tinctorial power, good opacity and good heat stability.

Based on the polymeric material to be mass dyed the thiazine indigo pigments according to the invention are used in amounts of 0.01 to 30% by weight, preferably of 0.1 to 10% by weight.

Of particular interest is the capability of compounds according to formula (I) in which $R_3$ and/or $R_4$ are different from hydrogen, to be transformed into compounds according to formula (I) in which $R_3$ and $R_4$ both are hydrogen. This can be achieved by thermal treatment (heating at temperature from 50 to 400° C., preferably from 100 to 200° C., or irradiation with laser beam), by photolytic treatment (irradiation with light of wave length under 375 nm) or chemical treatment with organic or inorganic acids or bases, whereby the solids, solutions or dispersions containing such pigments in organic or aqueous carriers, polymeric solutions or melts are treated and the various treatments can be combined. This means that lacquers, printing inks (especially for ink jet) and plastics, e.g. in fiber form can be mass dyed with compounds in masked form which are then transformed into the pigments in free form. Such application allows to obtain such mass dyed substrates with superior qualities regarding purity, dyeing strength, brilliance and transparency.

It is also possible to prepare a solid solution or a mixture of thiazine-indigo pigments according to formula (I) and another pigment of the class previously listed, especially of the class of diketopyrrolopyrrole, quinacridone or thiazine-indigo, by decomposing the carbamate of a thiazine-indigo pigment in the presence of the carbamate of another pigment. Alternatively, the carbarnate of the thiazine-indigo pigment is added and decomposes in the preparation of the other pigment. One can also prepare a solution of carbamates in an organic solvent and initiate the decomposition by adding an acid catalyst or a basic catalyst or by heating.

The transformations can be carried out in an inert solvent such as xylene or a xylene mixture, nitrobenzene, chlorobenzene, dimethylformamide, dimethylacetamide or N-methyl-pyrrolidone.

There now follows a series of examples which serve to illustrate the invention.

EXAMPLE 1

To a solution of 25g (0.15 mol) of dichloromaleic anhydride in 250 ml of dimethylformamide and 20 ml of acetic, kept below 25° C. by an external water bath, are added in portions 47 g (0.15 mol) of o-aminothiophenol zinc salt, over two hours. The yellow suspension so formed is gradually heated up to 130° C., over 24 hours. The red-orange suspension is filtered hot, washed with dimethylformamide and ethanol. The orange solid is dried at 80° C. under vacuum. 37.4 g (76.5%) of an orange pigment are isolated.

COMPARATIVE EXAMPLE X

Reaction carried out in acetic acid solution according to a prior art process

Following the procedure described in DE 2 151 723 or in Helvetica Chimica Acta 57 (8), 2264–78 (1974), a mixture of 73 g (0.23 mol) of 2-aminothiophenol zinc salt and 35.4 g (0.21 mol) of dichloromaleic anhydride in 850 ml of acetic acid, is heated at reflux for 24 hours. The red suspension is filtered hot, washed with hot acetic acid, ethanol and water. The orange solid is dried at 80° C. under vacuum. 54.1 g of an orange solid are isolated. This crude pigment is heated in 300 ml of dimethylformamide at 100° C. for 2 hours and filtered hot, washed with dimethylformamide and ethanol. 49.6 g (72.1%) of orange pigment are isolated, after drying at 80° C. under vacuum.

COMPARATIVE EXAMPLE Y reaction carried out in a polar aprotic solvent according to a prior art process Following the procedure described in DE 2 536 120, a mixture of 29.6g (0.095 mol) of 2-aminothiophenol zinc salt and 17.4 g (0.1 mol) of dichloromaleic anhydride in 150 ml of dimethylformamide, is heated up to 130° C. The mixture is stirred overnight at 130° C. The red suspension is filtered hot, washed with hot dimethylfornamide, ethanol and water. The orange solid is dried at 80° C. under vacuum. 16.1 g (54.8%) of an orange pigment are isolated.

EXAMPLE 2

Preparation of asymmetric benzothiazine indigo compound

To a solution of 25 g (0.15 moles) of dichloromaleic anhydride in 250 ml of dimethylformamide and 20 ml of acetic acid are added, in portions over 1 hour, 23.53 g (0.075 moles) of o-aminothiophenol zinc salt. During the addition, the temperature of the reaction mixture is maintained below 25° C. by means of a water bath. Thereafter, 25.6 g (0.075 moles) of 2-amino-5-methylthiophenol zinc salt are added in portions over a 1 hour period. The resultant yellow suspension is gradually heated to 130° C. and maintained at this temperature for 24 hours. The resultant red-orange suspension is filtered hot, and washed with dimethylformamide and ethanol. The remaining red-orange solid is dried at 80° C. under vacuum. 40.3 g (79%) of a brilliant orange pigment are isolated.

EXAMPLES 3–26

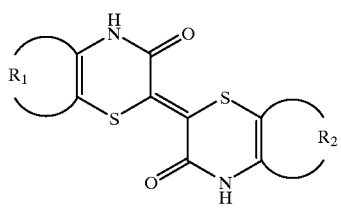

The compounds of Examples 3 to 26 are synthesised according to a process described in Example 2 using the appropriate starting materials.

| Example | R₁ | R₂ | Hue in PVC |
|---|---|---|---|
| 3 | phenyl | chlorophenyl | Orange |
| 4 | phenyl | chlorophenyl | Orange |
| 5 | phenyl | methoxyphenyl | Orange |
| 6 | phenyl | trifluoromethylphenyl | Yellow |
| 7 | phenyl | methylphenyl | Orange |
| 8 | phenyl | pyridyl | Orange |
| 9 | phenyl | dimethyl-diazine | Orange |
| 10 | methylphenyl | chlorophenyl | Orange |
| 11 | methylphenyl | chlorophenyl | Orange |
| 12 | methylphenyl | methoxyphenyl | Orange |
| 13 | methylphenyl | trifluoromethylphenyl | Yellow |
| 14 | methylphenyl | methylphenyl | Red |
| 15 | methylphenyl | pyridyl | Orange |
| 16 | methylphenyl | dimethyl-diazine | Orange |
| 17 | iodophenyl | chlorophenyl | Red |
| 18 | iodophenyl | methoxyphenyl | Orange |
| 19 | iodophenyl | trifluoromethylphenyl | Yellow |
| 20 | iodophenyl | methylphenyl | Red |

-continued

| Example | R₁ | R₂ | Hue in PVC |
|---|---|---|---|
| 21 | (phenyl-I) | (N=CH-pyridyl) | Orange |
| 22 | (phenyl-I) | (N,N-dimethylaminophenyl) | Red |
| 23 | (dichloro-iodo-vinyl) | (isoprenyl dimethyl) | Red |
| 24 | (dichloro-iodo-vinyl) | (dimethyl vinyl) | Orange |
| 25 | (dichloro-iodo-vinyl) | (methylbenzyl) | Red |
| 26 | (dichloro-iodo-vinyl) | (N,N-dimethylaminophenyl) | Red |

EXAMPLE 27

A suspension of 30 g trans-2,2'-bis(4 H-1,4-benzothiazine)-indigo in 350 ml N,N-dimethylformamide is mixed with 2,8 g 4-dimethylaminopyridine and then 42,2 g di-tert-butyl-dicarbonate is added. The mixture is stirred at ambient temperature under exclusion of atmospheric humidity. After 6 hours again 31 g di-tert-butyl-dicarbonate are added and during 16 hours the stirring continued. The precipitated yellow product is filtrated, washed with 40 ml N,N-dimethylformamide and 300 ml methanol and dryed in vacuum at ambient temperature. One obtains 43,5 g of the product with the formula

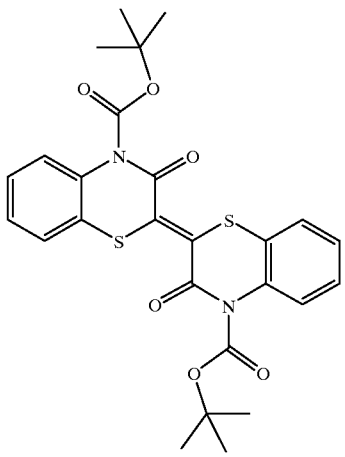

EXAMPLE 28

A suspension of 35,4 g 7,7'-dimethyl-trans-2,2'-bis(4 H-1,4-benzothiazine)-indigo in 250 ml N,N-dimethylformamide are mixed with 3,3 g 4-dimethylaminopyridine and then 45,8 g di-tert-butyl-dicarbonate are added. The mixture is stirred at ambient temperature under exclusion of atmospheric humidity. After 6 hours again 45,8 g di-tert-butyl-dicarbonate are added and during 16 hours the stirring continued. The precipitated yellow product is filtrated, washed with 50 ml N,N-dimethylformamide and 400 ml methanol and dryed in vacuum at ambient temperature. One obtains 53,5 g of the product with the formula

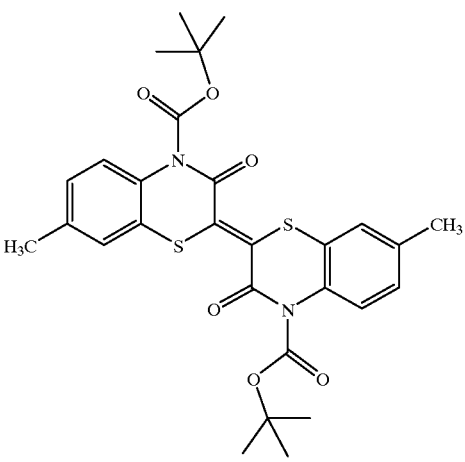

EXAMPLE 29

A suspension of 22,12 g 7,7'-dichloro-trans-2,2'-bis(4 H-1,4-benzothiazine)-indigo in 300 ml N,N-dimethylfornamide are mixed with 1,78 g 4-dimethylaminopyridine and then 26,8 g di-tert-butyl-dicarbonateare added. The mixture is stirred at ambient temperature under exclusion of atmospheric humidity. After 6 hours again 26,8 g di-tert-butyl-dicarbonate are added and during 16 hours the stirring continued. The precipitated yellow product is filtrated, washed with 50 ml N,N-dimethylformamide and 130 ml methanol and dryed in vacuum at ambient temperature. One obtains 30 g of the product with the formula

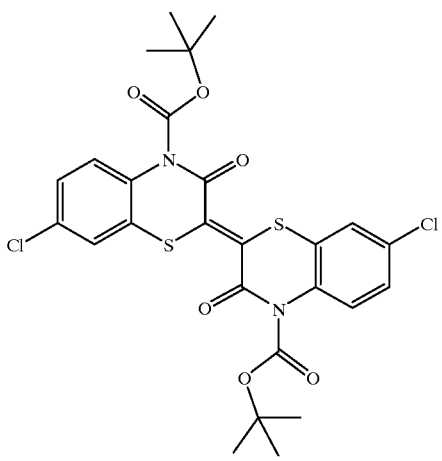

EXAMPLE 30

In an analogous manner, when using trans-2,2'-bis(4 H-1,4-naphthothiazine)-indigo of the formula

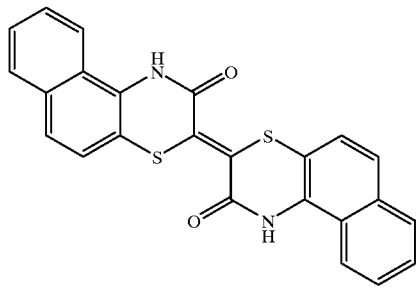

the corresponding trans-2,2'-bis(4 H-1,4-naphthothiazine)-indigo of the formula

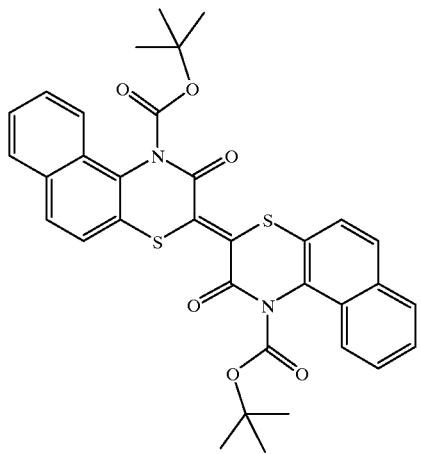

can be produced. 4,7 g of the product are obtained.

EXAMPLES 31–33

In an analogous manner, when using trans-2,2'-bis(4 H-1,4-benzothiazine)-indigo compounds of the formula

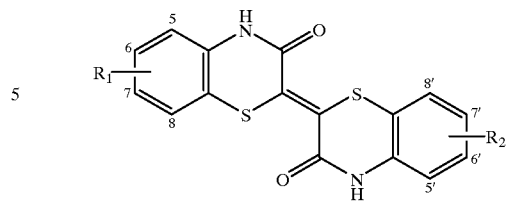

in which $R_1$ and $R_2$ have the meaning indicated in columns 2 and 3 of the following table, corresponding trans-2,2'-bis(4 H-1,4-benzothiazine)-indigo compounds of the formula

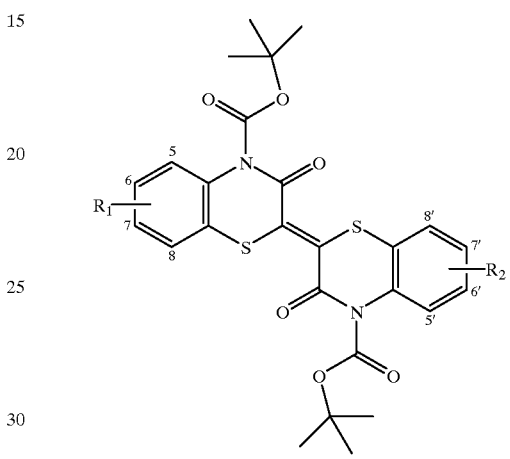

are produced.

TABLE

| Example | $R_1$ | $R_2$ | Results |
|---|---|---|---|
| 31 | 6-Cl | 6'-Cl | 92,1% |
| 32 | 7-CH$_3$ | 7'-Cl | 86% |
| 33 | 6-Cl | 7'-CH$_3$ | 95,6% |

EXAMPLE 34

0,520 g N,N'-bis(tert.-butoxycarbonyl)-trans-2,2'-bis(4 H-1,4-benzothiazine)-indigo from Example 27 are heated during 40 minutes at 200° C. in a reaction vessel. One obtains 0,318 g of an orange powder. The analytical data of the powder correspond to those of pure trans-2,2'-bis(4 H-1,4-benzothiazine)-indigo.

EXAMPLE 35

A mixture of 3,16 g N,N'-bis(tert.-butoxycarbonyl)-trans-2,2'-bis(4 H-1,4-benzo-thiazine)-indigo from Example 27 and 11,4 g toluene-4-sulfonic acid-monohydrate in 75 ml N,N-di-methylformamide is heated to 100° C. under stirring, stirring is continued at this temperature for 4 hours and then the mixture is allowed to cool down to room temperature. The precipitated pigment is filtrated, washed first with 25 ml N,N-dimethylformamide then with 75 ml methanol and dryed in vacuum at 90° C. One obtains 1,8 g of a red-orange powder. The analytical data of the powder correspond to those of pure trans-2,2'-bis(4 H-1,4-benzo-thiazine)-indigo. The yield of the transformation amounts to 92%.

EXAMPLE 36

A mixture of 3,32 g N,N'-bis(tert.-butoxycarbonyl)-7,7'-dimethyl-trans-2,2'-bis(4 H-1,4-benzo-thiazine)-indigo from Example 28 and 11,4 g toluene-4-sulfonic acid-monohydrate in 75 ml N,N-di-methylformamide is heated to 100° C. under stirring, stirring is continued at this temperature for 4 hours and then the mixture is allowed to cool down to room temperature. The precipitated pigment is filtrated, washed first with 35 ml N,N-dimethylformamide then with 75 ml methanol and dryed in vacuum at 90° C. One obtains 2,0 g of an orange powder. The analytical data of the powder correspond to those of pure 7,7'-dimethyl-trans-2,2'-bis(4 H-1,4-benzothiazine)-indigo. The yield of the transformation amounts to 97%.

EXAMPLE 37

A mixture of 5 g N,N'-bis(tert.-butoxycarbonyl)7,7'-dichloro-trans-2,2'-bis(4 H-1,4-benzo-thiazine)-indigo from Example 29 and 4 g toluene-4-sulfonic acid-monohydrate in 150 ml N,N-dimethylacetamide is heated to 100° C. under stirring, stirring is continued at this temperature for 4 hours and then the mixture is allowed to cool down to room temperature. The precipitated pigment is filtrated, washed first with 35 ml N,N-dimethylacetamide then with 100ml methanol and dryed in vacuum at 90° C. One obtains 3,0 g of a red powder. The analytical data of the powder correspond to those of pure 7,7'-dichloro-trans-2,2'-bis(4 H-1,4-benzothiazine)-indigo. The yield of the transformation amounts to 90%.

EXAMPLE 38

1,05 g N,N'-bis(tert.-butoxycarbonyl)-trans-2,2'-bis(4 H-1,4-benzothiazine)-indigo from Example 27 are stirred in 20 ml acetone. Then 2 ml HCl 30% are added at once. The mixture is stirred during 7 hours under reflux and then cooled to 30° C. The precipitated pigment is filtrated, washed first with 50 ml acetone, then with 20 ml methanol and dryed in vacuum at 90° C. One obtains 0,466 g of an orange powder. The analytical data of the powder correspond to those of pure trans-2,2'-bis(4 H-1,4-benzothiazine)-indigo.

EXAMPLE 39

1,11 g N,N'-bis(tert.-butoxycarbonyl)-7,7'-dimethyl-trans-2,2'-bis(4 H-1,4-benzothiazine)-indigo from Example 28 are stirred in 20 ml acetone. Then 2 ml HCl 30% are added at once. The mixture is stirred during 23 hours under reflux and then cooled to 30° C. The precipitated pigment is filtrated, washed first with 50 ml acetone, then with 50 ml methanol and dryed in vacuum at 90° C. One obtains 0,625 g of an orange powder. The analytical data of the powder correspond to those of pure 7,7'-dimethyl-trans-2,2'-bis(4 H-1,4-benzothiazine)-indigo.

Each of the pigments (obtained according to Examples 1 to 39) are milled following a known procedure. A 500 ml glass flask is filled with log of pigment, 30 g of NaCl, 150 ml of acetone and 500 g of glass beads having a diameter of 0.6 to 0.9 mm. The flask is closed and rotated on a roller mill for 72 hours. The glass beads are separated, the pigment suspension is filtered and washed with 2 liters of water. The pigment is dried at 80° C. under vacuum before testing.

EXAMPLE 40
Co-synthesis of benzothiazine-indigo with 3,6-di(4-chlorophenyl)-1,4-diketopyrrolo-[3,4,c]-pyrrole: 80/20

A reactor of 500 ml is charged with 150 ml of dimethylformamide and 15 ml of acetic acid, then 16.7 g (0.1 mol) of dichloromaleic anhydride, and 6.1 g of 3,6-di(4-chlorophenyl)-1,4-diketopyrrolo-[3,4,c]-pyrrole. 15.65 g ( 0.05 mol) of o-aminothiophenol zinc salt is added over 45 min, keeping the temperature below 20° C. A further 15.65 g ( 0.05 mol) of zinc salt is added over 30 min. The resultant red suspension is gradually heated to 135° C. and the temperature maintained for 12 hours. The red suspension is filtered hot, and washed with dimethylformamide and ethanol. The red solid is dried at 80° C. under vacuum. 29.12 g of a red pigment is isolated. A 500 ml glass flask is filled with 10 g of the crude pigment, 30 g of NaCl, 150 ml of acetone and 500 g of glass beads having a diameter of 0.6 to 0.9 mm. The flask is closed and rotated on a roller mill for 16 hours. The glass beads are separated, the pigment suspension is diluted with water, filtered and washed with 2 liters of water. The pigment is dried at 80° C. under vacuum, and ground before testing.

EXAMPLE 41
Co-synthesis of benzothiazine-indigo with 3,6-di(4-chlorophenyl)-1,4-diketopyrrolo-[3,4,c]-pyrrole: 50/50

A reactor of 500 ml is charged with 150 ml of dimethylformamide and 15 ml of acetic acid, then 11.7 g (0.07 mol) of dichloromaleic anhydride, and 17.11 g of 3,6-di(4-chlorophenyl)-1,4-diketopyrrolo-[3,4,c]-pyrrole. 10.96 g ( 0.035 mol) of o-aminothiophenol zinc salt is added over 45 min, keeping the temperature below 20° C. A further 10.96 g ( 0.035 mol) of zinc salt is added over 30 min. The resultant red suspension is gradually heated to 135° C. and the temperature maintained for 12 hours. The red suspension is filtered hot, and washed with dimethylformamide and ethanol. The red solid is dried at 80° C. under vacuum. 27.4 g of a red pigment is isolated. A 500 ml glass flask is filled with 10 g of the crude pigment, 30 g of NaCl, 150 ml of acetone and 500 g of glass beads having a diameter of 0.6 to 0.9 mm. The flask is closed and rotated on a roller mill for 16 hours. The glass beads are separated, the pigment suspension is diluted with water, filtered and washed with 2 liters of water. The pigment is dried at 80° C. under vacuum, and ground before testing.

EXAMPLE 42
Co-synthesis of benzothiazine-indigo with 2,9-dimethylquinacridone: 80/20

A reactor of 500 ml is charged with 150 ml of dimethylformamide and 15 ml of acetic acid, then 16.7 g (0.1 mol) of dichloromaleic anhydride, and 6.1 g of 2,9-dimethylquinacridone. 15.65 g ( 0.05 mol) of o-aminothiophenol zinc salt is added over 45 min, keeping the temperature below 20° C. A further 15.65 g ( 0.05 mol) of zinc salt is added over 30 min. The resultant red suspension is gradually heated to 135° C. and the temperature maintained for 12 hours. The red suspension is filtered hot, and washed with dimethylformamide and ethanol. The red solid is dried at 80° C. under vacuum. 25 g of a red pigment is isolated. A 500 ml glass flask is filled with 10 g of the crude pigment, 30 g of NaCl, 150 ml of acetone and 500 g of glass beads having a diameter of 0.6 to 0.9 mm. The flask is closed and rotated on a roller mill for 16 hours. The glass beads are separated, the pigment suspension is diluted with water, filtered and washed with 2 liters of water. The pigment is dried at 80° C. under vacuum, and ground before testing.

EXAMPLE 43
Co-synthesis of benzothiazine-indigo with 13-quinacridone: 80/20

A reactor of 500 ml is charged with 150 ml of dimethylformamide and 15 ml of acetic acid, then 16.7 g (0.1 mol) of dichloromaleic anhydride, and 6.1 g of -quinacridone.

15.65 g ( 0.05 mol) of o-aminothiophenol zinc salt is added over 45 min, keeping the temperature below 20° C. A further 15.65 g ( 0.05 mol) of zinc salt is added over 30 min. The resultant red suspension is gradually heated to 135° C. and the temperature maintained for 12 hours. The red suspension is filtered hot, and washed with dimethylformamide and ethanol. The red solid is dried at 80° C. under vacuum. 26 g of a red pigment is isolated. A 500 ml glass flask is filled with 10 g of the crude pigment, 30 g of NaCl, 150 ml of acetone and 500 g of glass beads having a diameter of 0.6 to 0.9 mm. The flask is closed and rotated on a roller mill for 16 hours. The glass beads are separated, the pigment suspension is diluted with water, filtered and washed with 2 liters of water. The pigment is dried at 80° C. under vacuum, and ground before testing.

EXAMPLES 44–100

Co-synthesis and/or Solid solutions of thiazine-indigos (I)

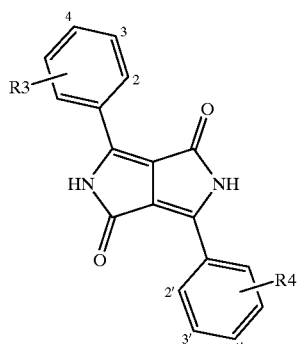
(I)

with pigments of following structures (II), (III), (IV), (V), (VI), (VII), (VIII) or (IX)

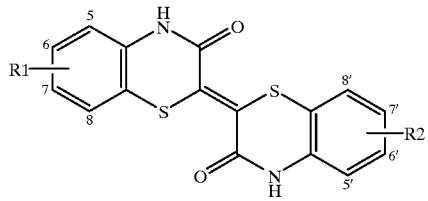
(II)

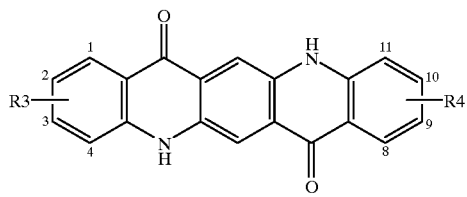
(III)

-continued

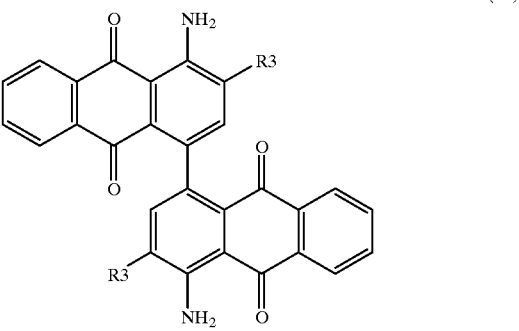
(IV)

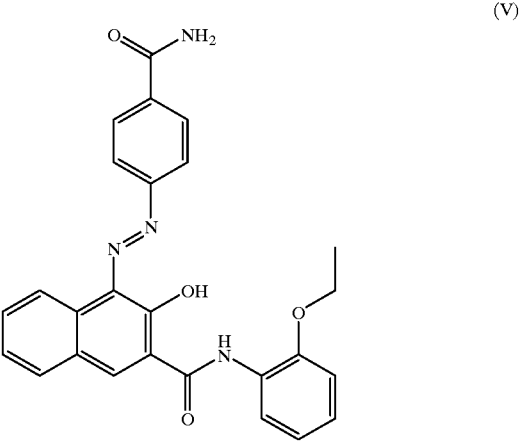
(V)

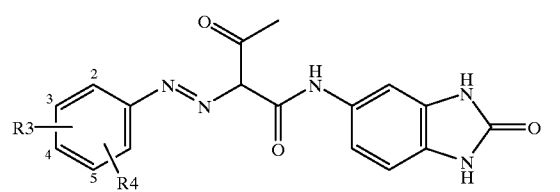
(VI)

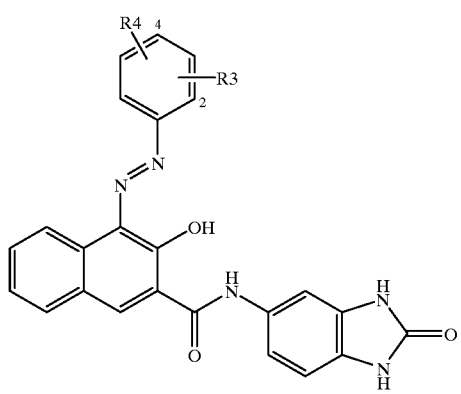

(VII)

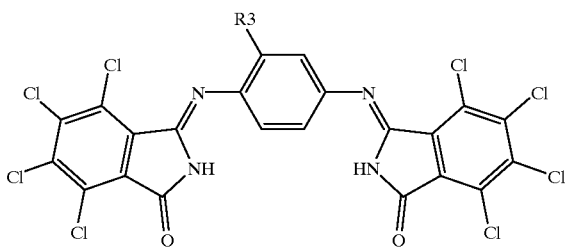

(VIII)

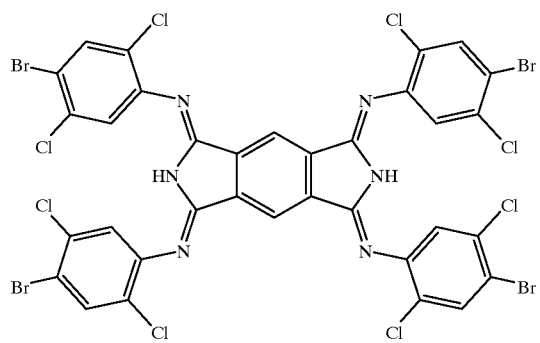

(IX)

are prepared according to the process described in the previous examples 40–43, adjusting the amount of pigment introduced in the beginning to reach the expected ratio between thiazine-indigo and the other pigment. They are listed in the following table.

| Ex. | Thiazine- $R_1$ | Indigo $R_2$ | Other $R_3$ | pigment $R_4$ | Ratio | Hue in laquers |
|---|---|---|---|---|---|---|
| | | | structure (II) | | | |
| 44 | H | H | 4-Cl | 4'-Cl | 80/20 | red scarlet |
| 45 | " | " | 4-Cl | 4'-Cl | 50/50 | red |
| 46 | " | " | 3-CN | 3'-CN | 80/20 | orange |
| 47 | " | " | 3-CN | 3'-CN | 50/50 | red |
| 48 | 7-CH$_3$ | 7'-CH$_3$ | 4-Cl | 4'-Cl | 80/20 | red |
| 49 | " | " | 4-Cl | 4'-Cl | 50/50 | red |
| 50 | " | " | 3-CN | 3'-CN | 80/20 | orange |
| 51 | " | " | 4-terButyl | 4'-terButyl | 50/50 | orange |
| 52 | 7-Cl | 7'-Cl | 4-Cl | 4'-Cl | 80/20 | red |
| 53 | " | " | 4-Cl | 4'-Cl | 50/50 | red |
| 54 | " | " | 3-CN | 3'-CN | 80/20 | red |
| 55 | " | " | 3-CN | 3'-CN | 50/50 | red |
| | | | structure (III) | | | |
| 56 | H | H | H | H | 80/20 | red |
| 57 | " | " | H | H | 50/50 | red |
| 58 | " | " | 2-CH$_3$ | 9-CH$_3$ | 50/50 | red |
| 59 | " | " | 2-Cl | 9-Cl | 80/20 | red |
| 60 | 7-CH$_3$ | 7'-CH$_3$ | H | H | 50/50 | red |
| 61 | " | " | 2-CH$_3$ | 9-CH$_3$ | 50/50 | red |
| 62 | " | " | 2-Cl | 9-Cl | 80/20 | red |
| 63 | 7-Cl | 7'-Cl | H | H | 50/50 | red |
| 64 | " | " | 2-CH$_3$ | 9-CH$_3$ | 80/20 | red |
| 65 | " | " | 2-Cl | 9-Cl | 80/20 | red |
| | | | structure (IV) | | | |
| 66 | H | H | H | H | 50/20 | reddish orange |
| 67 | " | " | Br | Br | 80/20 | red |
| 68 | " | " | Br | Br | 50/50 | red |
| 69 | 7-CH$_3$ | 7'-CH$_3$ | H | H | 50/50 | red |
| 70 | " | " | Br | Br | 50/50 | red |
| 71 | 7-Cl | 7'-Cl | H | H | 80/20 | red |
| 72 | " | " | Br | Br | 80/20 | red |
| 73 | " | " | Br | Br | 50/50 | red |

-continued

| Ex. | Thiazine-$R_1$ | Indigo $R_2$ | Other $R_3$ | pigment $R_4$ | Ratio | Hue in laquers |
|---|---|---|---|---|---|---|
| | | | structure (V) | | | |
| 74 | H | H | " | " | 80/20 | red |
| 75 | " | " | " | " | 50/50 | red scarlet |
| 76 | 7-$CH_3$ | 7'-$CH_3$ | " | " | 50/50 | reddish orange |
| 77 | " | " | " | " | 20/80 | red |
| 78 | 7-Cl | 7'-Cl | " | " | 80/20 | red |
| 79 | " | " | " | " | 50/50 | red |
| | | | structure (VI) | | | |
| 80 | H | H | 3-$COOCH_3$ | 5-$COOCH_3$ | 80/20 | orange |
| 81 | " | " | 2-$COOCH_3$ | 5-$COOCH_3$ | 80/20 | orange |
| 82 | " | " | 2-$NO_2$ | 4-Cl | 50/50 | orange |
| 83 | 7-$CH_3$ | 7'-$CH_3$ | 3-$COOCH_3$ | 5-$COOCH_3$ | 80/20 | yellow |
| 84 | " | " | 2-$COOCH_3$ | 5-$COOCH_3$ | 80/20 | yellow |
| 85 | " | " | 2-$NO_2$ | 4-Cl | 50/50 | orange |
| 86 | 7-Cl | 7'-Cl | 3-$COOCH_3$ | 5-$COOCH_3$ | 80/20 | orange |
| 87 | " | " | 2-$COOCH_3$ | 5-$COOCH_3$ | 80/20 | orange |
| 88 | " | " | 2-$NO_2$ | 4-Cl | 50/50 | reddish orange |
| | | | structure (VII) | | | |
| 89 | H | H | 2-$COOCH_3$ | H | 50/50 | red |
| 90 | " | " | 2-$OCH_3$ | 4-$CONHC_6H_5$ | 80/20 | red |
| 91 | 7-$CH_3$ | 7'-$CH_3$ | 2-$COOCH_3$ | H | 50/50 | red |
| 92 | " | " | 2-$OCH_3$ | 4-$CONHC_6H_5$ | 80/20 | red |
| 93 | 7-Cl | 7'-Cl | 2-$COOCH_3$ | H | 50/50 | red |
| 94 | " | " | 2-$OCH_3$ | 4-$CONHC_6H_5$ | 80/20 | red |
| | | | structure (VIII) | | | |
| 95 | H | H | H | | 80/20 | yellow |
| 96 | 7-$CH_3$ | 7'-$CH_3$ | H | | 50/50 | yellow |
| 97 | 7-Cl | 7'-Cl | Cl | | 30/70 | yellow |
| | | | structure (IX) | | | |
| 98 | H | H | " | " | 80/20 | yellow |
| 99 | 7-$CH_3$ | 7'-$CH_3$ | " | " | 50/50 | yellow |
| 100 | 7-Cl | 7'-Cl | " | " | 30/70 | yellow |

EXAMPLE 101

A mixture of 8,93 g of N,N'-bis(tert-butoxycarbonyl)7,7'-dichloro-trans-2,2'-bis(4 H-1,4-benzothiazine)-indigo from example 29 and 7,89 g of N,N'-bis(tert-butoxycarbonyl)-trans-2,2'-bis(4 H-1,4-benzothiazine)-indigo from example 27 in 160 ml of N,N'-dimethyl-acetamide, is heated up to 110° C. and stirred at this temperature for 2 hours. The solid is filtered at 60° C., washed with 100 ml of dimethylacetamide and 100 ml of methanol, then dried at 90° C. under vacuum. 10 g of a red powder are obtained.

EXAMPLE 102

A mixture of 7,32 g of N,N'-bis(tert-butoxycarbonyl)-trans-2,2'-bis(4 H-1,4-benzothiazine)-indigo from example 27 and 7,89 g of N,N'-bis(tert-butoxycarbonyl)-1,4-diketo-3,6-diphenyl-pyrrolo[3,4-c]pyrrole (prepared according to EP 0648770) in 150 ml of N-methylpyrrolidone is heated to 80° C. The solution of the carbamates is then heated to 135° C. and stirred at this temperature for 2 hours. The solid is filtered at 60° C., washed with 125 ml of dimethylformamide and 100 ml of methanol, then dried at 90° C. under vacuum. 7,2 g of a dark red powder are obtained.

EXAMPLE 103

A mixture of 6,25 g of N,N'-bis(tert-butoxycarbonyl)-7,7'-dichloro-trans-2,2'-bis(4 H-1,4-benzothiazine)-indigo from example 29 and 6,03 g of N,N'-bis(tert-butoxycarbonyl)-1,4-diketo-3,6-di(4-chlorophenyl)-pyrrolo[3,4-c]pyrrole (prepared according to EP 0648770) in 150 ml of dimethylacetamide is heated to 60° C. 8 g of para-toluenesulfonic acid monohydrate are added and the mixture is heated to 110° C. and stirred at this temperature for 4 hours. The solid is filtered at 50° C., washed with 50 ml of dimethylacetamide and 150 ml of methanol, then dried at 90° C. under vacuum. 7,7 g of a red powder are obtained.

EXAMPLE 104

A mixture of 2,05 g of N,N'-bis(tert-butoxycarbonyl)-trans-2,2'-bis(4 H-1,4-benzothiazine)-indigo from example 27 and 2 g of N,N'-bis(tert-butoxycarbonyl)-quinacridone (prepared as described in the example 27, replacing the thiazine-indigo with quinacridone) in 250 ml of toluene is refluxed. Then 1,5 g of para-toluenesulfonic acid monohydrate is added. The mixture is refluxed 30 mn further. The solid is filtered, washed with 120 ml of toluene and 80 ml of methanol, then dried at 90° C. under vacuum. 2,38 g of a red powder are obtained.

EXAMPLE 105

A mixture of 310 ml of dimethylsulfoxide and 14,5 ml of sodium hydroxide 32% is heated to 45° C. Then 12 g of 1,4-diketo-3,6-di(4-chlorophenyl)-pyrrolo[3,4-c]pyrrole and 12 g of trans-2,2'-bis(4 H-1,4-benzothiazine)-indigo are introduced in the alcaline solution. The mixture is then heated at 85° C. for 30 mn. The hot alcaline solution is transferred into another reactor containing 700 ml of methanol at 25° C. The suspension of pigment is then refluxed for 3 hours and filtered, washed with 400 ml of methanol, 600 ml of water, then dried at 90° C. under vacuum. 21,3 g of a red powder are obtained.

EXAMPLE 106

10,7 g of 1,4-diketo-3,6-di(4-chlorophenyl)-pyrrolo[3,4-c]pyrrole and 9,8 g of trans-2,2'-bis(4 H-1,4-benzothiazine)-indigo are introduced in a reactor containing 200 ml of 96% concentrated sulfuric acid at 20° C. At the end of the introduction, a fine dark red suspension of pigment is obtained. The mixture is stirred for 4 hours at 20° C. Then the pigment is precipitated in 600 ml of water and heated 35° C. for one hour. The suspension of pigment is then filtered and washed out with water, and dried at 90° C. under vacuum. 18,55 g of a red powder is obtained.

Application in PVC Masstone

The preparation of a 1% colored PVC sheet is performed following the DIN 53775A procedure:

100 parts of clear PVC are mixed with 1 part of pigment (obtained according to Example 1) for 2 minutes. The mixture is passed between two rollers for 5 minutes, the front roller being heated at 178° C. and the rear roller being heated at 163° C. The PVC sheet is then treated again between the two rollers heated at 80° C. Then the sheet is pressed under a pressure of 30 tonnes between two chromium-plated steel plates heated at 165° C., for 30 seconds. The pressed sheet is colored with an orange shade.

Application in PVC White

The preparation of a 0.5% colored PVC sheet is performed following the DIN 53775B procedure:

100 parts of PVC-white ( 5% TiO2)are mixed with 0.6 part of pigment for 2 minutes. The mixture is passed between two rollers for 5 minutes, the front roller being heated at 178° C. and the rear roller being heated at 163° C. The PVC sheet is then treated again between the two rollers heated at 80° C. Then the sheet is pressed under a pressure of 30 tonnes between two chromium-plated steel plates heated at 165° C., for 30 seconds.

Application in Lacquers Masstone

The preparation of the alkydmelamine-formaldehyde (AMF) resin coating is performed following the DIN 53235-1, DIN 8780/2 and 8781/1 procedures:

8 parts of pigment, 72 parts of clear AMP (BASF FF68-0102 14071) and 250 parts of glass beads are stirred in a Skandex stirrer for 10 minutes. 5 parts of this preparation are mixed with 5 parts of clear AMF (BASF FF68-0102 14071). The dispersion is sprayed on a cardboard sheet, air-dried for 10 minutes and baked at 130° C. in an oven for 30 minutes.

Application in Lacquers White

The preparation of the alkydmelamine-formaldehyde (AMF) resin coating is performed following the DIN 53235-1, DIN 8780/2 and 8781/1 procedures:

8 parts of pigment, 72 parts of clear AMF (BASF FF68-0102 14071) and 250 parts of glass beads are stirred in a Skandex stirrer for 10 minutes. 3 parts of this preparation are mixed with 25 parts of AMP-white (13ASF FD68-0410 11074). The dispersion is sprayed on a cardboard sheet, air-dried for 10 minutes and baked at 130° C. in an oven for 30 minutes.

The pigments prepared in comparative Examples X and Y are compared with the pigment prepared in Example 1. The calorimetric measurements are reported in Tables I and II, and clearly show that the new process gives a cleaner product.

TABLE I

CIELAB MEASUREMENTS IN PVC AGAINST EXAMPLE I

| | PVC Masstone | | | | PVC white | | | |
|---|---|---|---|---|---|---|---|---|
| Ex. | DE* | DH* | DC* | DL* | DE* | DH* | DC* | DL* |
| Ex. X | 6.51 | −2.5 redder | −6.02 duller | −3.47 darker | 3.95 | −2.69 | −2.89 | −1.61 |
| Ex. Y | 3.59 | −1.92 redder | −3.03 duller | −2.18 darker | 3.26 | −2.73 | −1.78 | −1.19 |

TABLE II

CIELAB MEASUREMENTS IN LACQUER AGAINST EXAMPLE 1

| | Lacquer Masstone | | | | Lacquer white | | | |
|---|---|---|---|---|---|---|---|---|
| Exp. | DE* | DH* | DC* | DL* | DE* | DH* | DC* | DL* |
| Ex. X | 10.75 | −2.99 | −10.33 | −4.6 | 2.75 | −1.87 | 2.02 | −0.59 |
| Ex. Y | 6.14 | −2.01 | −5.8 | −2.72 | 1.59 | −1.38 | −0.79 | 1.06 |

DH*, DC* and DL* are the colorimetric coordinates in the polar system L*, C* and H* of the CIELAB system. In these measurements, the point that represents the product Example 1 in lacquer or PVC is taken as the origin of the axes. So that these figures show the difference between Example X and 1, and Example Y and 1. A negative value of DC* means products X and Y are duller than Example 1 in PVC or lacquer.

What is claimed is:

1. A pigment of the formula (I)

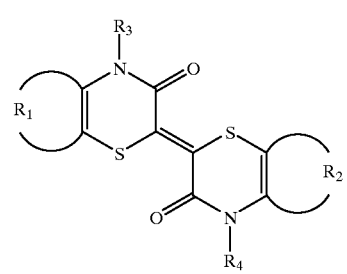

(I)

wherein $R_1$ and $R_2$ are independently the atoms necessary to complete the formation of a substituted or unsubstituted aromatic or aliphatic carbocyclic or heterocyclic ring system, the radicals $R_3$ and $R_4$, independently of each other, are hydrogen or a group of the formulae (II), (III) or (IV)

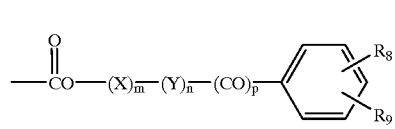

(II)

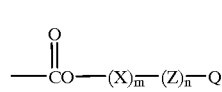

(III)

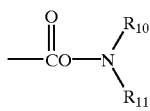

(IV)

whereby in the formulae (II), (III) and (IV)

m, n and p, independently of each other, are zero or 1;
X $C_{1-14}$-alkylene or $C_{2-8}$-alkenylene;
Y a group —V—$(CH_2)_q$—;
Z a group —V—$(CH_2)_r$—;
V $C_{3-6}$-cycloalkylene;
q a number of 1 to 6; and
r a number of zero to 6,
$R_8$ and $R_9$ independently of each other, signify hydrogen, $C_{1-6}$-alkyl, $C_{1-4}$-alkoxy, halogen, CN, $NO_2$, unsubstituted phenyl or phenoxy, phenyl or phenoxy substituted by $C_{1-4}$-alkyl, $C_{1-4}$-alkoxy or halogen;
Q hydrogen, CN, $Si(R_8)_3$, a group $C(R_{12})(R_{13})(R_{14})$, in which $R_{12}$, $R_{13}$ and $R_{14}$ are halogen; a group

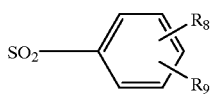

in which $R_8$ and $R_9$ have the above meaning; a group $SO_2$—$R_{15}$ or $SR_{15}$, in which $R_{15}$ is $C_{1-4}$-alkyl; a group $CH(R_{16})_2$, in which $R_{16}$ is unsubstituted phenyl or phenyl substituted by $C_{1-4}$-alkyl, $C_{1-4}$-alkoxy or halogen; or a group of the formula

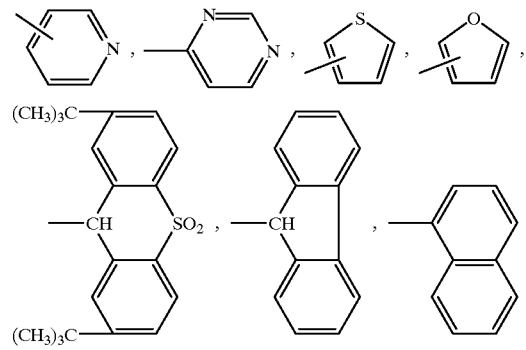

$R_{10}$ and $R_{11}$ independently of each other, signify hydrogen, $C_{1-18}$-alkyl, a group

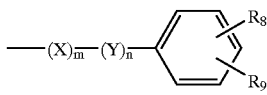

in which X, Y, $R_8$, $R_9$, m and n have the above meaning, or $R_{10}$ and $R_{11}$, together represent a chain necessary to complete formation of a pyrrolidine, piperidine or mornholine ring system, provided that, if $R_3$ and/or $R_4$ are a group of the formula (III), Q is hydrogen and n is zero, m must be 1 and X is a $C_{2-14}$-alkylene- or $C_{2-8}$-alkenylene group which is branched at the carbon atom bound to oxygen, and if both $R_3$ and $R_4$ are hydrogen, $R_1$ and $R_2$ cannot be identical.

2. A process of forming a thiazine indigo pigment of the formula (I)

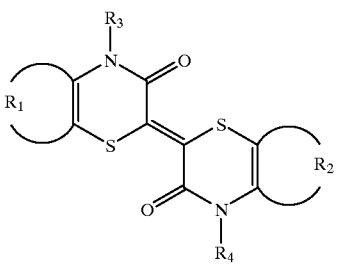

wherein $R_1$ and $R_2$ are independently the atoms necessary to complete the formation of a substituted or unsubstituted aromatic or aliphatic carbocyclic or heterocyclic ring system, the radicals $R_3$ and $R_4$, independently of each other, are hydrogen; comprising the step of:

reacting in the presence of a solvent system comprising a carboxylic acid an an inert polar aprotic solvent, a compound of formula (XV) and a compound of (XV)

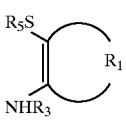

(XVI)

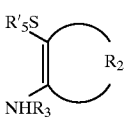

wherein $R_5$ and $R'_5$ independently are H or a metallic ion selected from $Na^+$, $K^+$ or $Zn^{2+}$ with a compound of formula (XVII) in its cis- or trans- form

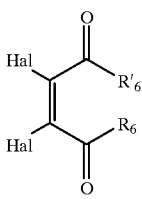

(XVII)

wherein Hal is F, Cl or Br, $R_6$ and $R'_6$ independently of the other is a leaving group commonly used in substitution reactions at carbonyl carbon atoms or together $R_6$ and $R'_6$ represent an oxygen atom.

3. The process according to claim 2, wherein the carboxylic acid is acetic acid.

4. The process according to claim 2, wherein the polar aprotic solvent is dimethylformamide.

5. The process according to claim 2, wherein the solvent system consists of 5 to 95% by weight of carboxylic acid and 95 to 5% by weight of polar aprotic solvent.

6. The process according to claim 2, wherein the leaving group is Cl or alkoxy.

7. A solid solution of a thiazine indigo pigment according to formula (I)

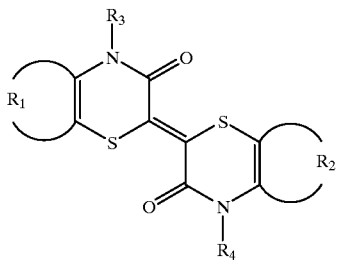

(I)

wherein $R_1$ and $R_2$ are independently the atoms necessary to complete the formation of a substituted or unsubstituted aromatic or aliphatic carbocyclic or heterocyclic ring system, the radicals $R_3$ and $R_4$, independently of each other, are hydrogen or a group of the formulae (II), (III) or (IV)

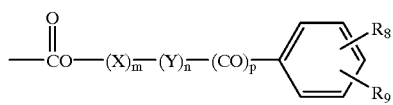

(II)

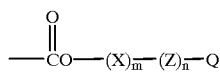

(III)

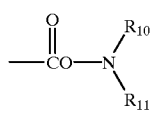

(IV)

whereby in the formulae (II), (III) and (IV)

m, n and p, independently of each other are zero or 1;
X $C_{1-14}$-alkylene or $C_{2-8}$-alkenylene;
Y a group —V—$(CH_2)_q$—;
Z a group —V—$(CH_2)_r$—;
V $C_{3-6}$-cycloalkylene;
q a number of 1 to 6; and
r a number of zero to 6,
$R_8$ and $R_9$ independently of each other, signify hydrogen, $C_{1-6}$-alkyl, $C_{1-4}$-alkoxy, halogen, CN, $NO_2$, unsubstituted phenyl or phenoxy, phenyl or phenoxy substituted by $C_{1-4}$-alkyl, $C_{1-4}$-alkoxy or halogen;
Q hydrogen, CN, $Si(R_8)_3$, a group $C(R_{12})(R_{13})(R_{14})$, in which $R_{12}$, $R_{13}$ and $R_{14}$ are halogen; a group

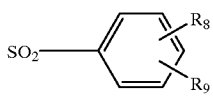

in which $R_8$ and $R_9$ have the above meaning; a group $SO_2$—$R_{15}$ or $SR_{15}$, in which $R_{15}$ is $C_{1-4}$-alkyl; a group $CH(R_{16})_2$, in which $R_{16}$ is unsubstituted phenyl or phenyl substituted by $C_{1-4}$-alkyl, $C_{1-4}$-alkoxy or halogen; or a group of the formula

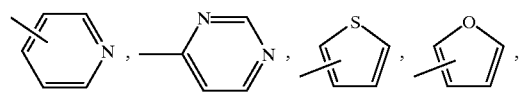

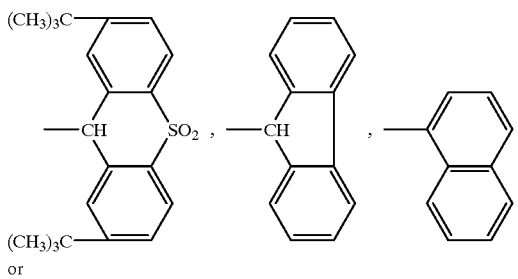

or

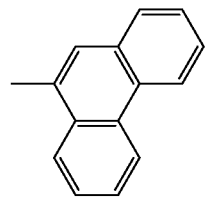

$R_{10}$ and $R_{11}$ independently of each other, signify hydrogen, $C_{1-18}$-alkyl, a group

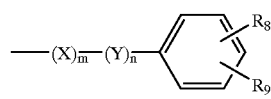

in which X, Y, $R_8$, $R_9$, m and n have the above meaning, or
$R_{10}$ $R_{11}$, together represent a chain necessary to complete formation of a pyrrolidine, piperidine or morpholine ring system,
provided that, if $R_3$ and/or $R_4$ are a group of the formula (III), Q is hydrogen and n is zero, m must be 1 and X is a $C_{2-14}$-alkylene- or $C_{2-8}$-alkenylene group which is branched at the carbon atom bound to oxygen, and if both $R_3$ and $R_4$ are hydrogen, $R_1$ and $R_2$ cannot be identical; and another pigment selected from the group consisting of azoic coupling components, diketopyrrolo-pyrrole, quinacridone, anthraquinone, benzimidazole, azo condensation, isoindolinone, isoindoline, perylene, dioxazine, indigo, thioindigo, metal complex, perinone, quinophthalone and phthalocyanine pigments and wherein the thiazine indigo pigment in the solid solution is between 20 and 80% by weight based upon the weight of the solid solution.

8. A mixture of a thiazine indigo pigment according to formula (I)

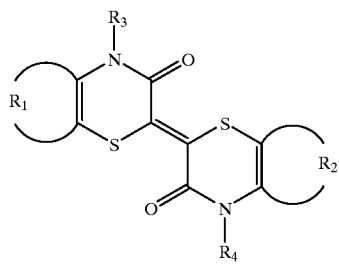

(I)

wherein $R_1$ and $R_2$ are independently the atoms necessary to complete the formation of a substituted or unsubstituted aromatic or aliphatic carbocyclic or heteocyclic ring system, the radicals $R_3$ and $R_4$, independently of each other, are hydrogen or a group of the formulae (II), (III) or (IV)

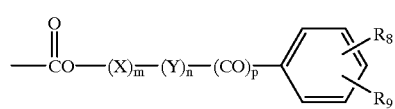

(II)

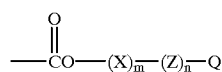

(III)

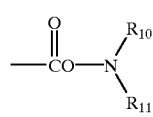

(IV)

whereby in the formulae (II), (III) and (IV)

m, n and p, independently of each other, are zero or 1;

X $C_{1-14}$-alkylene or $C_{2-8}$-alkenylene;

Y a group —V—$(CH_2)_q$—;

Z a group —V—$(CH_2)_r$—;

V $C_{3-6}$-cycloalkylene;

q a number of 1 to 6; and r a number of zero to 6, $R_8$ and $R_9$ independently of each other, signify hydrogen, $C_{1-6}$-alkyl, $C_{1-4}$-alkoxy, halogen, CN, $NO_2$, unsubstituted phenyl or phenoxy, phenyl or phenoxy substituted by $C_{1-4}$-alkyl, $C_{1-4}$-alkoxy or halogen;

Q hydrogen, CN, $Si(R_8)_3$, a group $C(R_{12})(R_{13})(R_{14})$, in which $R_{12}$, $R_{13}$ and R14 are halogen; a group

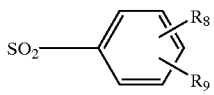

in which $R_8$ and $R_9$ have the above meaning; a group $SO_2$—$R_{15}$ or $SR_{15}$, in which $R_{15}$ is $C_{1-4}$-alkyl; a group $CH(R_{16})_2$, in which $R_{16}$ is unsubstituted phenyl or phenyl substituted by $C_{1-4}$-alkyl, $C_{1-4}$-alkoxy or halogen; or a group of the formula

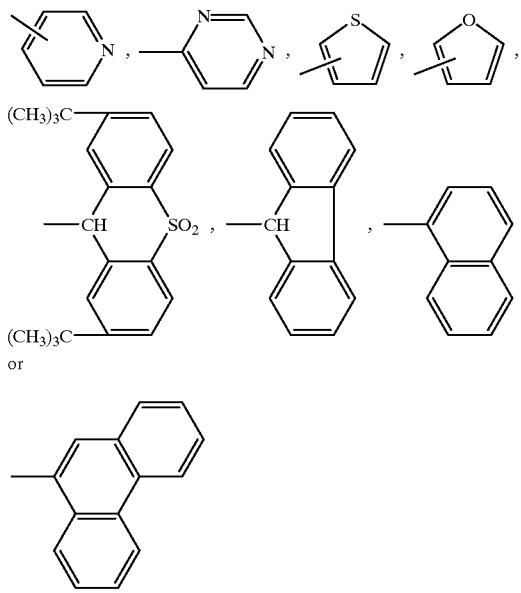

or $R_{10}$ and $R_{11}$ independently of each other, signify hydrogen, $C_{1-18}$-alkyl, a group

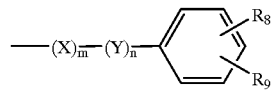

in which X, Y, $R_8$, $R_9$, m and n have the above meaning, or $R_{10}$ and $R_{11}$, together represent a chain necessary to complete formation of a pyrrolidine, piperidine or morpholine ring system, provided that, if $R_3$ and/or $R_4$ are a group of the formula (III), Q is hydrogen and n is zero, m must be 1 and X is a $C_{2-14}$-alkylene- or $C_{2-8}$-alkenylene group which is branched at the carbon atom bound to oxygen, and if both $R_3$ and $R_4$ are hydrogen, $R_1$ and $R_2$ cannot be identical; and another pigment selected from the group consisting of azoic coupling components, diketopyrrolo-pyrrole, quinacridone, anthraquinone, benzimidazole, azo condensation, isoindolinone, isoindoline, perylene, dioxazine, indigo, thioindigo, metal complex, perinone, quinophthalone and phthalocyanine pigments, and wherein the thiazine indigo pigment in the mixture is between 20 and 80% by weight based upon the weight of the mixture.

9. A process of forming a thiazine indigo pigment of formula (I)

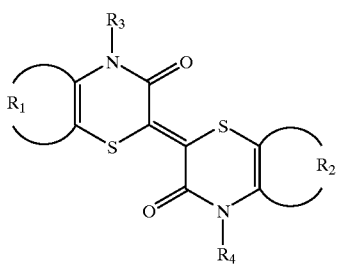
(I)

wherein $R_1$ and $R_2$ are independently the atoms necessary to complete the formation of a substituted or unsubstituted aromatic or aliphatic carbocyclic or heterocyclic ring system, the radicals $R_3$ and $R_4$, independently of each other, are hydrogen or a group of formulae (II), (III), or (IV)

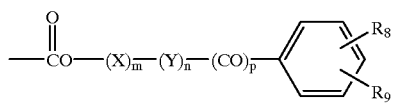
(II)

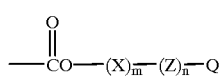
(III)

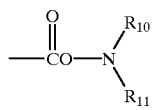
(IV)

with the proviso that at least one of substituents $R_3$ and $R_4$ is not hydrogen, whereby in the formulae (II) (III) and (IV)

m, n and p, independently of each other are zero or 1;

X $C_{1-14}$-alkylene or $C_{2-8}$-alkenylene.

Y a group —V—$(CH_2)_q$—;

Z a group —V—$(CH_2)_r$—;

V $C_{3-6}$-cycloalkylene;

q a number of 1 to 6; and r a number of zero to 6.

$R_8$ and $R_9$ independently of each other, signify hydrogen, $C_{1-6}$-alkyl, $C_{1-4}$-alkoxy, halogen, CN, $NO_2$, unsubstituted phenyl or phenoxy, phenyl or phenoxy substituted by $C_{1-4}$-alkyl, $C_{1-4}$-alkoxy or halogen, Q hydrogen, CN, $Si(R_8)_3$, a group $C(R_{12})(R_{13})(R_{14})$, in which $R_{12}$, $R_{13}$ and $R_{14}$ are halogen, a group

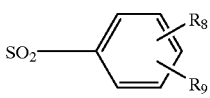

in which $R_8$ and $R_9$ have the above meaning; a group $SO_2$—$R_{15}$ or $SR_{15}$, in which $R_{15}$ is $C_{1-4}$-alkyl; a group $CH(R_{16})_2$, in which $R_{16}$ is unsubstituted phenyl or phenyl substituted by $C_{1-4}$-alkyl $C_{1-4}$-alkoxy or halogen; or a group of the formula

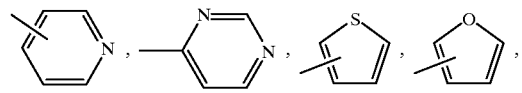

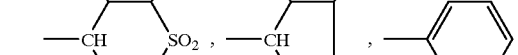

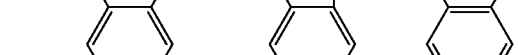

or

$R_{10}$ and $R_{11}$ independently of each other, signify hydrogen, $C_{1-18}$-alkyl, a group

in which X, Y, $R_8$, $R_9$, m and n have the above meaning, or $R_{10}$ and $R_{11}$, together represent a chain necessary to complete formation of a pyrolidine, piperidine or mornholine ring system;

comprising reacting the pigment of the formula (I) in which both $R_3$ and $R_4$ are hydrogen, with a dicarbonate of formula (V)

$R_3$—O—$R'_3$ (V)

or with a trihaloacetic acid ester of formula (VI)

$(R_7)_3$—C—$R'_3$ (VI)

or with a mixture of dicarbonate of formula (V) and a dicarbonate of formula (VII)

$R'_4$—O—$R'_4$ (VII)

or with a mixture of trihaloacetic acid ester of formula (VI) and a trihaloacetic acid ester of formula (VIII)

$(R_7)_3$—C—$R'_4$ (VIII)

or with an azide of formula (IX)

$R_3N_3$ (IX)

which can also be used as a mixture 1:1 with an azide of formula (X)

$R_4N_3$ (X)

or with a carbonate of formula (XI)

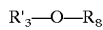 (XI)

which can also be used as a mixture 1:1 with a carbonate of formula (XII)

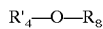 (XII)

or with an alkylideneiminooxyformic acid ester of formula (XIII)

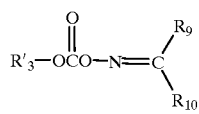 (XIII)

which can also be used as a mixture 1:1 of formula (XIV)

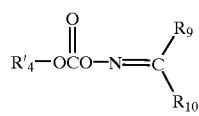 (XIV)

whereby in the formulae (V), (VI), (VII), (VIII), (IX), (X), (XI), (XII), (XIII) and (XIV)

$R'_3$ and $R'_4$ have meanings of $R_3$ and $R_4$ except hydrogen, $R_7$ is chlorine, fluorine, or bromine, $R_8$ is $C_{1-4}$alkyl, unsubstituted phenyl or phenyl substituted by halogen, $C_{1-4}$alkyl, $C_{1-4}$alkoxy or —CN, $R_9$ is —CN or —COOR$_8$, and $R_{10}$ is unsubstituted phenyl or phenyl substituted by halogen, $C_{1-4}$alkyl, $C_{1-4}$alkoxy or —CN, in an aprotic organic solvent in the presence of a base as a catalyst.

10. A method of using a pigment according to formula (I)

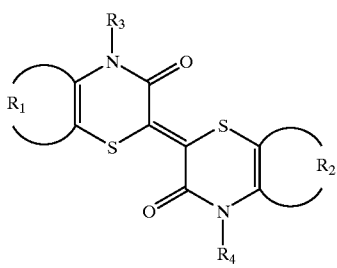 (I)

wherein $R_1$ and $R_2$ are independently the atoms necessary to complete the formation of a substituted or unsubstituted aromatic or aliphatic carbocyclic or heterocyclic ring system, the radicals $R_3$ and $R_4$, independently of each other, are hydrogen or a group of the formulae (II), (III) or (IV)

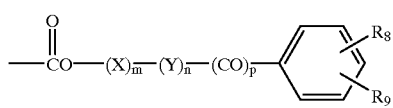 (II)

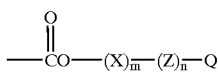 (III)

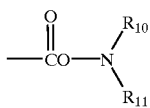 (IV)

whereby in the formulae (II), (II) and (IV)

m, n and p, independently of each other, are zero or 1;

X $C_{1-4}$-alkylene or $C_{2-8}$-alkenylene;

Y a group —V—(CH$_2$)$_q$—;

Z a group —V—(CH$_2$)$_r$—;

V $C_{3-6}$-cycloalkylene;

q a number of 1 to 6; and r a number of zero to 6, $R_8$ and $R_9$ independently of each other, signify hydrogen, $C_{1-6}$-alkyl, $C_{1-4}$-alkoxy, halogen, CN, NO$_2$, unsubstituted phenyl or phenoxy, phenyl or phenoxy substituted by $C_{1-4}$-alkyl, $C_{1-4}$-alkoxy or halogen;

Q hydrogen, CN, Si(R$_8$)$_3$, a group C(R$_{12}$)(R$_{13}$)(R$_{14}$), in which $R_{12}$, $R_{13}$ and $R_{14}$ are halogen; a group

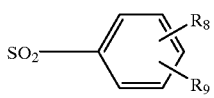

in which $R_8$ and $R_9$ have the above meaning; a group SO$_2$—R$_{15}$ or SR$_{15}$, in which $R_{15}$ is $C_{1-4}$-alkyl; a group CH(R$_{16}$)$_2$, in which $R_{16}$ is unsubstituted phenyl or phenyl substituted by $C_{1-4}$-alkyl, $C_{1-4}$-alkoxy or halogen; or a group of the formula

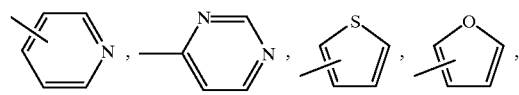

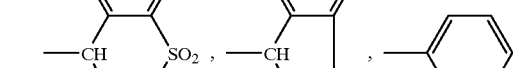

or

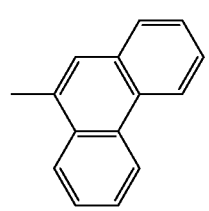

$R_{10}$ and $R_{11}$ independently of each other, signify hydrogen, $C_{1-18}$-alkyl, a group

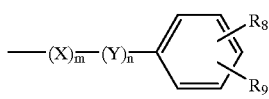

in which X, Y, R$_8$, R$_9$, m and n have the above meaning, or

R$_{10}$ and R$_{11}$, together represent a chain necessary to complete formation of a pyrrolidine, piperidine or morpholine ring system, provided that, if R$_3$ and/or R$_4$ are a group of the formula (III), Q is hydrogen and n is zero, m must be 1 and X a C$_{2-14}$-alkylene- or C$_{2-8}$-alkenylene group which is branched at the carbon atom bound to oxygen, and if both R$_3$ and R$_4$ are hydrogen, R$_1$ and R$_2$ cannot be identical;

for the mass pigmentation of a substrate comprising incorporating said pigment in said substrate.

11. The method according to claim 10, wherein said substrate is a synthetic polymer, a synthetic resin or a regenerated fiber.

12. The method of using a pigment of formula (I) according to claim 10 as a colorant wherein the substrate is a printing ink or a textile.

13. A method of using a solid solution of a thiazine indigo pigment according to formula (I)

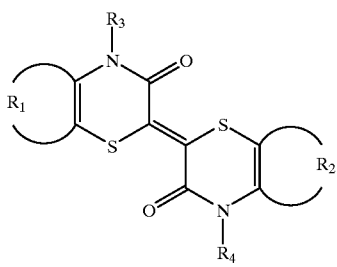

(I)

wherein R$_1$ and R$_2$ are independently the atoms necessary to complete the formation of a substituted or unsubstituted aromatic or aliphatic carbocyclic or heterocyclic ring system, the radicals R$_3$ and R$_4$, independently of each other, are hydrogen or a group of the formulae (II), (III) or (IV)

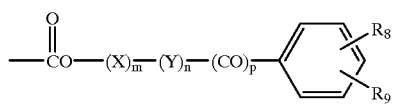

(II)

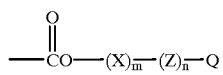

(III)

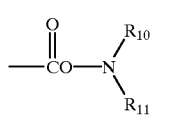

(IV)

whereby in the formulae (II), (III) and (IV)
m, n and p, independently of each other are zero or 1;
X C$_{1-14}$-alkylene or C$_{2-8}$-alkenylene;
Y a group —V—(CH$_2$)$_q$—;
Z a group —V—(CH$_2$)$_r$—;
V C$_{3-6}$-cycloalkylene;
q a number of 1 to 6; and
r a number of zero to 6, R$_8$ and R$_9$ independently of each other, signify hydrogen, C$_{1-6}$-alkyl, C$_{1-4}$-alkoxy, halogen, CN, NO$_2$, unsubstituted phenyl or phenoxy, phenyl or phenoxy substituted by C$_{1-4}$-alkyl, C$_{1-4}$-alkoxy or halogen;

Q hydrogen, CN, Si(R$_8$)$_3$, a group C(R$_{12}$)(R$_{13}$)(R$_{14}$), in which R$_{12}$, R$_{13}$ and R$_{14}$ are halogen; a group

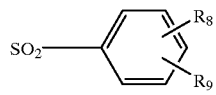

in which R$_8$ and R$_9$ have the above meaning; a group SO$_2$—R$_{15}$ or SR$_{15}$, in which R$_{15}$ is C$_{1-4}$-alkyl ; a group CH(R$_{16}$)$_2$, in which R$_{16}$ is unsubstituted phenyl or phenyl substituted by C$_{1-4}$-alkyl, C$_{1-4}$-alkoxy or halogen; or a group of the formula

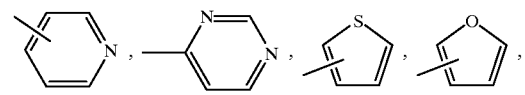

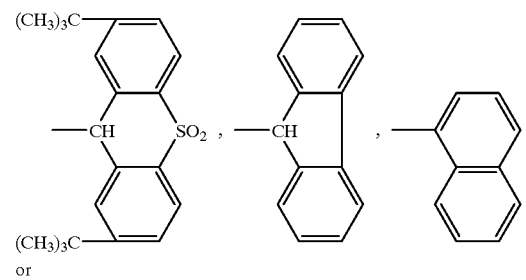

or

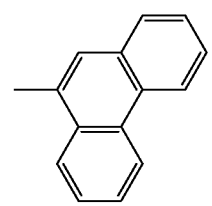

R$_{10}$ and R$_{11}$ independently of each other, signify hydrogen, C$_{1-18}$-alkyl, a group

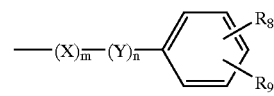

in which X, Y, R$_8$, R$_9$, m and n have the above meaning, or

R$_{10}$ and R$_{11}$, together represent a chain necessary to complete formation of a pyrrolidine, piperidine or morpholine ring system, provided that, if R$_3$ and/or R$_4$ are a group of the formula (III), Q is hydrogen and n is zero, m must be 1 and X a C$_{2-14}$-alkylene- or C$_{2-8}$-alkenylene group which is branched at the carbon atom bound to oxygen, and if both R$_3$ and R$_4$ are hydrogen, R$_1$ and R$_2$ cannot be identical; and another pigment selected from the group consisting of azoic coupling components, diketopyrrolo-pyrrole, quinacridone, anthraquinone, benzimidazole, azo condensation, isoindolinone, isoindoline, perylene, dioxazine, indigo, thioindigo, metal complex, perinone, quinophthalone and phthalocyanine pigments; for the mass pigmentation of a substrate comprising incorporating said solid solution in said substrate.

14. The method according to claim 13, wherein said substrate is a synthetic polymer, a synthetic resin or a regenerated fiber.

15. The method of using a solid solution as claimed in claim 13 as a colorant wherein the substrate is a printing ink or a textile.

16. A method of using a mixture of a thiazine indigo pigment according to formula (I)

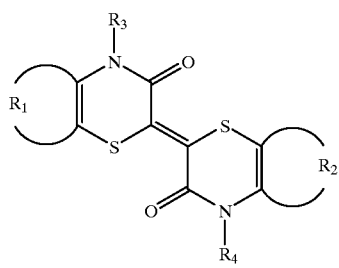

(I)

wherein $R_1$ and $R_2$ are independently the atoms necessary to complete the formation of a substituted or unsubstituted aromatic or aliphatic carbocyclic or heterocyclic ring system, the radicals $R_3$ and $R_4$, independently of each other, are hydrogen or a group of the formulae (II), (III) or (IV)

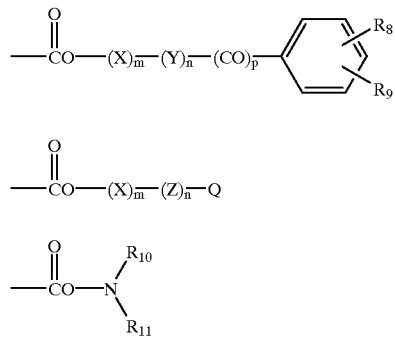

(II)

(III)

(IV)

whereby in the formulae (II), (III) and (IV)
m, n and p, independently of each other, are zero or 1;
X $C_{1-14}$-alkylene or $C_{2-8}$-alkenylene;
Y a group —V—$(CH_2)_q$—;
Z a group —V—$(CH_2)_r$—;
V $C_{3-6}$-cycloalkylene;
q a number of 1 to 6; and
r a number of zero to 6,
$R_8$ and $R_9$ independently of each other, signify hydrogen, $C_{1-6}$-alkyl, $C_{1-4}$-alkoxy, halogen, CN, $NO_2$, unsubstituted phenyl or phenoxy, phenyl or phenoxy substituted by $C_{1-4}$-alkyl, $C_{1-4}$-alkoxy or halogen;
Q hydrogen, CN, $Si(R_8)_3$, a group $C(R_{12})(R_{13})(R_{14})$, in which $R_{12}$, $R_{13}$ and $R_{14}$ are halogen; a group

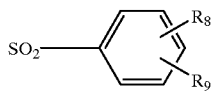

in which $R_8$ and $R_9$ have the above meaning; a group $SO_2$—$R_{15}$ or $SR_{15}$, in which $R_{15}$ is $C_{1-4}$-alkyl; a group $CH(R_{16})$, in which $R_{16}$ is unsubstituted phenyl or phenyl substituted by $C_{1-4}$-alkyl, $C_{1-4}$-alkoxy or halogen; or a group of the formula

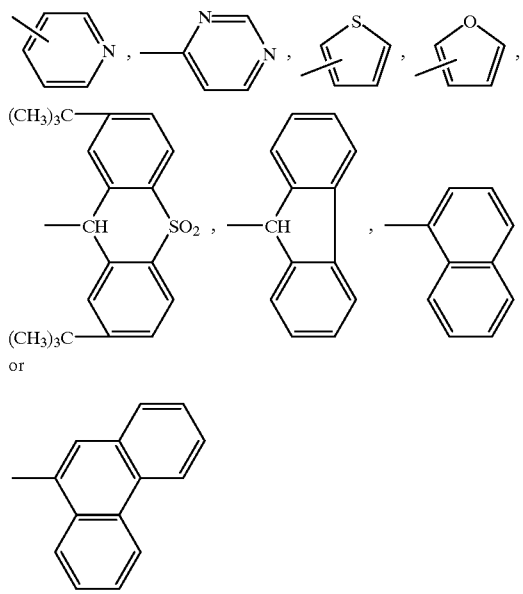

or $R_{10}$ and $R_{11}$ independently of each other, signify hydrogen, $C_{1-18}$-alkyl, a group

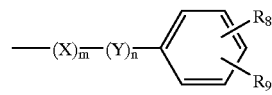

in which X, Y, $R_8$, $R_9$, m and n have the above meaning, or $R_{10}$ and $R_{11}$, together represent a chain necessary to complete formation of a pyrrolidine, piperidine or morpholine ring system, provided that, if $R_3$ and/or $R_4$ are a group of the formula (III), Q is hydrogen and n is zero, m must be 1 and X a $C_{2-14}$-alkylene- or $C_{2-8}$-alkenylene group which is branched at the carbon atom bound to oxygen, and if both $R_3$ and $R_4$ are hydrogen, $R_1$ and $R_2$ cannot be identical; and another pigment selected from the group consisting of azoic coupling components, diketopyrrolo-pyrrole, quinacridone, anthraquinone, benzimidazole, azo condensation, isoindolinone, isoindoline, perylene, dioxazine, indigo, thioindigo, metal complex, perinone, quinophthalone and phthalocyanine pigments;

for the mass pigmentation of a substrate comprising incorporating said mixture in said substrate.

17. The method according to claim 16, wherein said substrate is a synthetic polymer, a synthetic resin or a regenerated fiber.

18. The method of using a mixture as claimed in claim 16 as a colorant wherein the substrate is a printing ink or a textile.

19. A substrate selected from the group consisting of a synthetic polymer, a synthetic resin and a regenerated fiber comprising a pigment according to formula (I) as defined in claim 1 wherein the thiazine indigo pigment is in an amount between 0.01 and 30% by weight based on the weight of the substrate.

20. A substrate selected from the group consisting of a synthetic polymer, a synthetic resin and a regenerated fiber comprising a solid solution as claimed in claim 7 wherein the thiazine indigo pigment is in the solid solution in an amount between 20 and 80% by weight based upon the weight of the solid solution.

21. A substrate selected from the group consisting of a synthetic polymer, a synthetic resin and a regenerated fiber comprising a mixture as claimed in claim 8 wherein the thiazine indigo pigment is in the mixture in an amount between 20 and 80% by weight based upon the weight of the mixture.

22. A printing ink comprising a pigment according to formula (I) as defined in claim 1 wherein the thiazine indigo pigment is in the printing ink in an amount between 0.01 and 30% by weight based upon the weight of the substrate.

23. A printing ink comprising a solid solution a claimed in claim 7 wherein the thiazine indigo pigment is in the solid solution in an amount between 20 and 80% by weight based upon the weight of the solid solution.

24. A printing ink comprising a mixture as claimed in claim 8 wherein the thiazine indigo pigment is in the mixture in an amount between 20 and 80% be weight based upon the weight of the mixture.

25. A printed textile comprising a pigment according to formula (I) as defined in claim 1 wherein the thiazine indigo pigment is in an amount between 0.01 and 30% by weight based upon the weight of the substrate.

26. A printed textile comprising a solid solution as claimed in claim 7 wherein the thiazine indigo pigment is in the solid solution in an amount between 20 and 80% by weight based upon the weight of the solid solution.

27. A printed textile comprising a mixture as claimed in claim 8 wherein the thiazine indigo pigment is in the mixture in an amount between 20 and 80% by weight based upon the weight of the mixture.

* * * * *